United States Patent [19]

Ishiguro

[11] 4,077,053
[45] Feb. 28, 1978

[54] TELEVISION SIGNAL ENCODER UTILIZING A CORRELATION BETWEEN FRAMES

[75] Inventor: Tatsuo Ishiguro, Tokyo, Japan

[73] Assignee: Nippon Electric Company, Ltd., Tokyo, Japan

[21] Appl. No.: 674,998

[22] Filed: Apr. 8, 1976

[30] Foreign Application Priority Data

Apr. 9, 1975 Japan .................................. 50-43591

[51] Int. Cl.² ............................................. H06N 7/12
[52] U.S. Cl. .................................. 358/136; 325/38 B
[58] Field of Search ....................... 358/136, 133, 135; 325/38 B

[56] References Cited

PUBLICATIONS

Candy, et al., "Transmitting Television as Clusters of Frame-to-Frame Differences", A.T.&T., The Bell System Technical Journal, vol. 50, No. 6, July-Aug. 1971, pp. 1889-1917.

*Primary Examiner*—Howard W. Britton
*Attorney, Agent, or Firm*—Sughrue, Rothwell, Mion, Zinn and Macpeak

[57] ABSTRACT

A television signal encoder uses correlation between frames for data compression or reduction in redundancy of information to be transmitted. The coding error occurring in the interframe coding process is effectively corrected by low-bit intraframe coding with limited increase in the volume of coding information. This permits raising the significance determination threshold value without impairment of picture quality.

6 Claims, 5 Drawing Figures

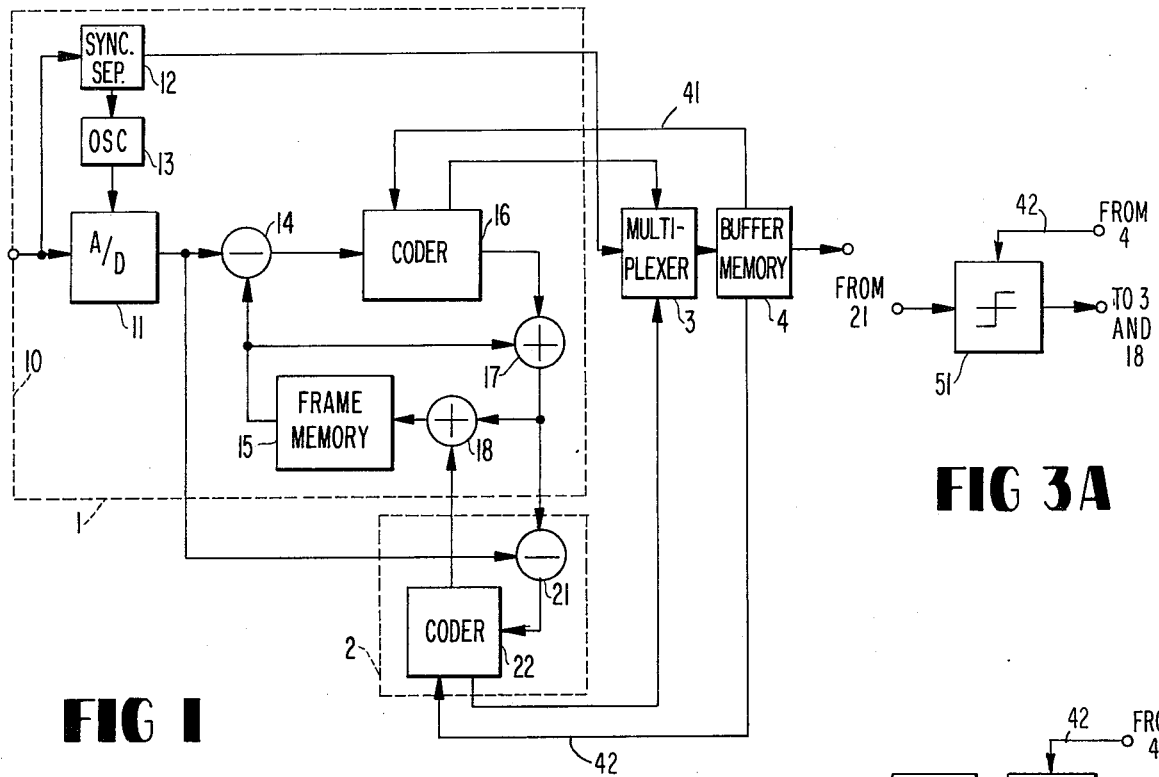
FIG 1
FIG 3A
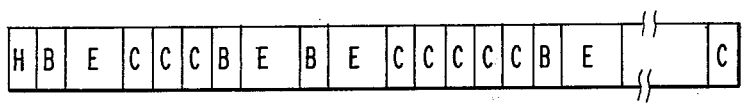
FIG 2
FIG 3B
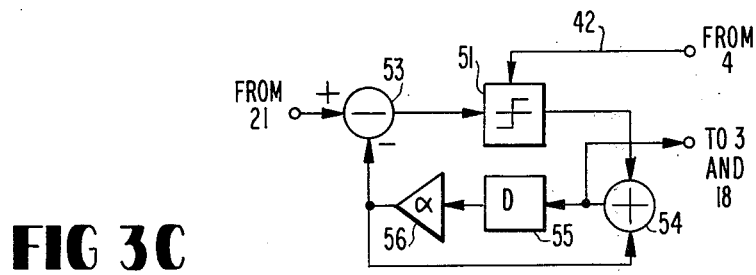
FIG 3C

TELEVISION SIGNAL ENCODER UTILIZING A CORRELATION BETWEEN FRAMES

BACKGROUND OF THE INVENTION

This invention relates to an apparatus for encoding television signals, and more specifically to television signal encoding devices of the type utilizing correlation between frames for data compression or reduction in redundancy of information to be transmitted.

Known as an encoding technique which enables transmission of television signals using, on the average, only one bit or so per sampled element is an interframe coding method such as the one proposed by J. C. Candy et al. in the article entitled "Transmitting Television as Clusters of Frame-to-Frame Differences, " *The Bell System Technical Journal*, Vol. 50, No. 6 (July – August, 1971), pp 1889 – 1917. The basic concept of the so-called interframe coding is to encode and transmit only information on "significant" picture-elements, i.e., those elements whose intensity changes between successive frames of television signal in amounts exceeding a certain threshold value. With this method, a substantially high ratio of compression and redundancy reduction can be obtained by setting the threshold at a rather high value in order to materially reduce the number of significant picture-elements. Obviously, the number of significant changes occurring between successive frames is limited in scenes with little activity but increases as motion in the scene increases. On the other hand, the number of significant elements decreases as the threshold value is raised. As for the picture quality, however, raising the threshold value increases the coding error, causing impairments in the picture. This makes it desirable to set the threshold at a lower value. Under this situation, the threshold value is usually changed in interframe coding to control the amount of coded information in accordance with the rate of occurrence of significant picture-elements.

In order to realize any high quality television transmission system by such interframe coding technique, it is necessary to lower the threshold value and raise the transmission bit rate. As the threshold value is reduced, however, the number of unwanted significant picture-elements occurring on account of the noise and small amplitude variations included in the television signal, increases and the amount of information to be transmitted starts to increase suddenly at a definite threshold value. Because of this, it has previously been practically infeasible to reduce the threshold value below a certain level and there has been a definite limitation to reduction of the coding error associated with determination of significant picture-elements.

SUMMARY OF THE INVENTION

The present invention has for its object the provision of a high-quality encoding device which is adapted to efficiently reduce the interframe-coding error associated with determination of significant picture-elements.

The present invention is primarily designed to provide a television signal encoder which is particularly adapted to reduce the interframe-coding error by intraframe-coding such error as extracted from the interframe-decoded signal in a low-bit form.

According to the present invention, there is provided a television signal encoder in which a television signal is interframe-coded by an interframe-coder. The interframe-coding error is detected and intraframe-coded by an intraframe-coder. The interframe-coded information is multiplexed with the intraframe-coded information and transmitted through a transmission line.

According to the television signal encoder of the present invention, the threshold value can be raised without impairing the picture quality, thereby supressing the occurrence of unwanted significant picture-elements. On the other hand, the interframe-coding error is corrected or compensated by intraframe coding with the result that the coding quality is substantially improved. The amount of information required for the intraframe coding may be given only at a limited bit rate as the amplitude of the interframe-coding error is much smaller than the signal amplitude, and this makes it possible to raise the transmission quality in an efficient manner.

BRIEF DESCRIPTION OF THE DRAWINGS

The above and other objects, features and advantages of the present invention will become apparent from the following description when taken in conjunction with the accompanying drawings, wherein:

FIG. 1 is a block diagram of a preferred embodiment of the present invention;

FIG. 2 is a diagram illustrating one example of encoded television signal format; and FIGS. 3A – 3C illustrate a few forms of intraframe coder usable in the present invention.

DESCRIPTION OF THE PREFERRED EMBODIMENT

Referring to FIG. 1, one preferred embodiment of the present invention comprises an interframe coder 1, an intraframe coder 2 for encoding the coding error as occurring in the interframe coding stage, a multiplexer 3 for multiplexing the interframe-coded and intraframe-coded information, and a buffer memory 4 provided to temporarily store information data occurring in an irregular fashion to feed them into the transmission channel at a definite flow rate.

The television signal, fed to an input terminal 10 of the interframe coder 1, is directed to an A/D (analog-digital) converter 11 to be converted into a PCM signal and also directed to a sync signal separator 12 where horizontal and vertical sync signals are extracted from the input television signal. The sync signals thus separated are fed to an oscillator 13 to control the oscillation frequency thereof and lock up the sampling frequency of the A/D converter 11 at an integral multiple of the television signal synchronizing frequency. The sampling frequency is so selected that the sampling time remains the same in successive picture frames.

The PCM signal from A/D converter 11 is fed to a subtractor 14 connected with a frame memory 15, which is a digital memory sized to memorize or store data for one frame of television signal and produces at its output a PCM interframe prediction signal for picture elements. The subtractor 14 thus transmits to a coder 16 the difference between the PCM signal input and the PCM signal fed from the frame memory 15 as an interframe prediction error signal.

The coder 16, determining the significance of the interframe prediction error signal or deciding whether the absolute amplitude value of the error signal exceeds a threshold value that determines which picture-elements are significant, functions to quantize and encode the interframe prediction error signal. As shown, the signal thus quantized is fed to an adder 17, the coded signal also being fed to the multiplexer 3.

In this coding stage, some additional functions may be served, as desired to reduce the amount of information, including such functions as that of ignoring any isolated significant picture-element and of bridging or coalescing runs that are separated by a small number of insignificant picture-elements, taking the latter as significant.

The adder 17 adds up the interframe prediction signal from the frame memory 15 and the quantized interframe prediction error signal to obtain a locally decoded interframe signal. The foregoing processes are basically known in the interframe coding technique and obviously it is possible to employ a complex prediction method which utilizes the intraframe prediction in combination with the interframe prediction to obtain an improved prediction efficiency.

Description will next be made of the stage of coding the interframe-coding error, which features the present invention.

Referring again to FIG. 1, the intraframe coder 2, includes a subtractor 21 which, substracting the locally coded interframe signal from the input signal fed thereto, i.e., the output of A/D converter 11, calculates the interframe-coding error. The interframe-coding error is coded by the intraframe 22, which produces a locally decoded signal and feeds it to an adder 18 included in the interframe coder 1 while the coded output of the intraframe coder 22 is also fed to the multiplexer 3. The adder 18 produces a corrected interframe locally decoded signal by adding the coded value of the interframecoding error to the interframe locally decoded signal. The corrected locally decodded signal is memorized as a prediction signal for the succeeding frame.

The multiplexer 3 serves the function of multiplexing an information including a combination of interframe coded significant picture-elements with address codes representing their position in the picture frame and the coded error information from the intraframe coder 2. The former information is obtained in the usual interframe coding stage and, for multiplexing the two kinds of information, any one of previously known methods may appropriately be employed.

One example of multiplexed code formation is illustrated in FIG. 2. As observed, the television signal is divided into blocks each including a definite number of picture-elements and those blocks which include significant picture-elements are addressed by indicating the position of the significant picture-elements in the respective block. In the format of FIG. 2, reference character H designates the sync code for horiziontal synchroning signals; B, a code indicating the position of a block including significant picture-elements and appearing every $m$ blocks; and C, a code representing the information of a block including significant picture-elements. The code C is formed of a code representing the coding mode in the block and the position of significant picture-elements in the block and a quantization code of the interframe prediction error. Reference character E designates an interframe coding error information which is fed from the interframe coder 2 in a lump for each group of a definite number of blocks as separated by code B.

The buffer memory 4 is provided to temporarily store the coded information as fed from the multiplexer 3 and to feed it into the transmission channel at a definite rate. Also, the buffer memory 4 feeds a signal, representing buffer memory occupancy, to the coders 16 and 22 by way of lines 41 and 42, respectively, so that the magnitude of the threshold value used for the significance determination, the quantization characteristics, etc., may be controlled in accordance with the buffer memory occupancy. Incidentally, various known forms of coding control, which are employed in the ordinary interframe-coding technique to avoid buffer memory overflow, are also applicable to the system described. For example, subsampling for reducing the sampling frequency by half, subline control for coding every other line of scan, thinning-out of fields or frames, and the like technique are also applicable to the system described but are not explained herein in any detail as they are not directly related to the operation of the present invention.

The intraframe coder 22, provided for encoding the interframecoding error, may take any suitable form, as illustrated in FIGS. 3A-3C, which shows some of the simplest forms available. In FIG. 3A, a coder 51 is illustrated which is employed for binary quantization of the error signal to represent it in the form of a one-bit code. The coding error can be reduced by employing a quantization level lower than the threshold value of the significance determination in the interframe coder, for example, by employing a quantization level corresponding to one-half the threshold value.

In FIG. 3B, there is illustrated another form of coder which includes an adaptation control added to the coder 51 shown in FIG. 3A. One function of the adaptation control is to change the level of quantization in accordance with the threshold value of coder 51, which is controlled in accordance with the buffer memory occupancy. Another function of the adaptation control is to reduce the amount of error coding information in order to enable distribution of a larger amount of data for reproduction of motion when the amount of motions in the scene and hence the volume of interframe coding information have increased. That is to say, an averaging circuit 52 is employed to switch the coding mode in which transmission of the interframe-coding error is effected for each sample to that in which the average of the values of every two or more samples taken consecutively is calculated, and such average value is encoded. The interframe-coding error usually has the same amplitude between neighboring picture-elements in a frame, and this makes it highly advantageous to encode only the average value of a plurality of picture-elements as in the manner described.

Another form of coder 22 which is adapted for DPCM (differential pulse code modulation) is illustrated in FIG. 3C, which comprises the binary quantizer 51, a subtractor 53, an adder 54, a register 55, and a coefficient unit 56 having an amplification valve, for example, of 0.75. Operation of this coder is the same as that of ordinary DPCM. As an error correction signal the output of adder 54 is supplied to the multiplexer 3 and the adder 18.

To summarize according to the present invention, the coding error occurring in the interframe coding process can be effectively corrected by low-bit intraframe coding with limited increase in the volume of coding information. Inasmuch as the interframe-coding error is corrected in this manner, the significance determination threshold value can be raised safely to avoid generation of any unwanted significant picture-elements caused by the noise or small variations in amplitude of the input television signal. It will thus be appreciated that the present invention makes it possible to encode the television signal with improved efficiency and quality.

What is claimed is:

1. A system for coding a television signal by the use of a frame correlation technique, said television signal consisting of a series of frames each defined by horizontal and vertical synchronizing signals and each representing a number of two-dimensionally arranged picture elements of an optical image to be transmitted, said coding system comprising:

means for sequentially comparing every two successive frames to produce an interframe-coded signal;

means responsive to said interframe-coded signal and said television signal for obtaining an interframe-coding error signal caused in said comparing means;

means for coding said interframe-coding error signal to produce an intraframe-coded signal; and means for multiplexing said intraframe-coded signal with said interframe-coded signal.

2. A system for coding a television signal as recited in claim 1, wherein said means for sequentially comparing comprises:

subtractor means receiving said television signal as one input and a signal corresponding to a preceding frame of the television signal as another input for producing a difference signal;

coder means connected to receive said difference signal and a threshold signal for generating an output when said difference signal exceeds said threshold signal; and memory means connected to the output of said coder means for storing data for one frame of the television signal and providing an output to said other input of said subtractor means.

3. A system for coding a television signal as recited in claim 2, further comprising a buffer memory means connected to receive the output of said means for multiplexing for temporarily storing information data occurring in an irregular fashion and providing said threshold signal to said coder means as a function of said buffer memory means occupancy.

4. A system for coding a television signal as recited in claim 3, wherein said means for coding said interframe-coding error signal comprises binary quantization means employing a quantization level lower in value than said threshold signal, said quantization level being determined by a signal from said buffer memory means.

5. A system for coding a television signal as recited in claim 4, wherein said means for coding said interframe-coding error signal further comprises averaging means connected between said means for obtaining an interfame-coding error signal and said binary quantization means.

6. A system for coding a television signal as recited in claim 4, wherein means for coding said interframe-coding error signal further comprises:

subtractor means connected between said means for obtaining an interframe-coding error signal and said binary quantization means; and feedback means connected between the output of said binary quantization means and a second input to said subtractor means to form a differential pulse code modulator.

* * * * *

UNITED STATES PATENT OFFICE
CERTIFICATE OF CORRECTION

Patent No. 4,077,053          Dated February 28, 1978

Inventor(s) Tatsuo ISHIGURO

It is certified that error appears in the above-identified patent and that said Letters Patent are hereby corrected as shown below:

IN THE SPECIFICATION:

Column 3, line 27 - After "intraframe" insert -- coder -- line 34 - delete "decodded" insert -- decoded -- line 62 - delete "interframe" insert -- intraframe --

Column 4, line 54 - delete "valve" insert -- value --

Signed and Sealed this

Twenty-seventh Day of June 1978

[SEAL]

Attest:

RUTH C. MASON
Attesting Officer

DONALD W. BANNER
Commissioner of Patents and Trademarks